(12) United States Patent
Yamauchi et al.

(10) Patent No.: US 8,180,181 B2
(45) Date of Patent: May 15, 2012

(54) IMAGE PROCESSING APPARATUS, IMAGE PROCESSING METHOD, AND IMAGE PROCESSING PROGRAM

(75) Inventors: Kazuyuki Yamauchi, Kanagawa (JP); Yuzo Oshima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 890 days.

(21) Appl. No.: 12/246,603

(22) Filed: Oct. 7, 2008

(65) Prior Publication Data

US 2009/0110306 A1 Apr. 30, 2009

(30) Foreign Application Priority Data

Oct. 31, 2007 (JP) ................. 2007-284199

(51) Int. Cl.
*G06K 9/54* (2006.01)
(52) U.S. Cl. ..................... 382/303
(58) Field of Classification Search .......... 382/317, 382/303
See application file for complete search history.

(56) References Cited

U.S. PATENT DOCUMENTS

| | | |
|---|---|---|
| 2001/0018330 A1 | 8/2001 | Yamauchi |
| 2001/0029530 A1 * | 10/2001 | Naito et al. .................. 709/223 |
| 2007/0240124 A1 * | 10/2007 | Taneda et al. ................ 717/129 |
| 2008/0059548 A1 | 3/2008 | Oshima |
| 2008/0062464 A1 * | 3/2008 | Sugi .............................. 358/1.16 |
| 2008/0068657 A1 | 3/2008 | Uchida et al. |

FOREIGN PATENT DOCUMENTS

| | | |
|---|---|---|
| JP | 2003-256216 | 9/2003 |
| JP | 2005-38198 | 2/2005 |
| JP | 2005-119122 | 5/2005 |
| JP | 3679349 | 5/2005 |
| JP | 2005-176159 | 6/2005 |
| JP | 2005-217825 | 8/2005 |
| JP | 2005-284384 | 10/2005 |
| JP | 2007-249411 | 9/2007 |
| JP | 2007-325251 | 12/2007 |

OTHER PUBLICATIONS

Japanese Office Action issued Jan. 10, 2012 in patent application No. 2007-284199.

* cited by examiner

*Primary Examiner* — Matthew Bella
*Assistant Examiner* — Dennis Rosario
(74) *Attorney, Agent, or Firm* — Oblon, Spivak, McClelland, Maier & Neustadt, L.L.P.

(57) ABSTRACT

A software architecture based on a concept called "pipes and filters" is applied to an image processing apparatus, thereby simplifying the customization, expansion, etc., of functions. In addition, filters are combined together using a description table in which the combination of the filters is described so as to construct a job, thereby further simplifying the customization, expansion, etc., of functions.

12 Claims, 12 Drawing Sheets

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus, an image processing method, and an image processing program.

2. Description of the Related Art

Recent image processing apparatuses such as printers, copiers, scanners, facsimile machines, or multi-function machines that realize the functions thereof in a single housing generally have a CPU similar to that of computers. The functions are implemented by the control of applications.

For example, an image forming apparatus described in JP-B2-3679349 (Patent Document 1) has a function shared by multiple applications as a platform and is capable of installing the applications using the API (Application Programming Interface) of the platform. With the shared function as the platform, it is possible for the image forming apparatus to prevent the installation of overlapped functions between the applications and improve development efficiency of all the applications.

Patent Document 1: JP-B2-3679349

However, if the granularity of the function provided by the platform or that of an interface is not properly designed in this configuration, the development efficiency of applications may not be improved according to expectation.

For example, if the granularity is too small, it is necessary to call many APIs even where an application provides a simple service. As a result, its source code becomes complicated.

On the other hand, if the granularity is too large, it is necessary to correct the platform when it is desired to install an application that provides a service obtained by modifying part of a function. As a result, the number of development steps may be increased. Particularly, if the dependence between modules is strong in the platform, it is necessary not only to add a new function to the platform but also to correct an existing part. As a result, things get very complicated.

In addition, when it is desired to install an application obtained by modifying part of a service (e.g., image input processing) provided by an existing application, it is not possible to call the existing application for parts other than the modified part. Accordingly, it is necessary to describe a source code and install a new application.

The present invention has been made in view of the above deficiencies and may provide an image processing apparatus, an image processing method, and an image processing program capable of simplifying the customization, expansion, etc., of functions.

SUMMARY OF THE INVENTION

In order to attain the above object, the following configurations are employed in the embodiments of the present invention.

According to one aspect of the present invention, there is provided an image processing apparatus. The apparatus comprises an input filter that controls input processing of image data to be input as an object for image processing; an output filter that controls output processing of the image data to be output; a work filter that applies work processing to the image data between the input filter and the output filter; and a construction component that constructs a combination of the input filter, the work filter, and the output filter based on a description table in which the combination is described.

According to this configuration, it is possible to simplify the customization, expansion, etc., of functions.

In addition, the image processing apparatus may further comprise an application component that provides a function of the image processing apparatus; wherein the application component has a table generation part that generates the description table based on a requested function, and a table registration part that registers the description table generated by the table generation part in the construction component.

In addition, the construction component may have a table analysis part that analyzes the description table and constructs the combination of the input filter, the work filter, and the output filter based on an analysis result of the table analysis part.

In addition, the image processing apparatus may further comprise plural of the description tables, wherein the construction component connects a combination of filters described by one of the description tables and a combination of filters described by another of the description tables to each other.

In addition, the image processing apparatus may further comprise at least three of the description tables, wherein the construction component selects at least the other two of the description tables based on the combination of the filters described by the one of the description tables and constructs a combination of filters based on the selected description tables.

According to another aspect of the present invention, there is provided an image processing method. The method comprises an input step of controlling input processing of image data to be input as an object for image processing; an output step of controlling output processing of the image data to be output; a work step of applying work processing to the image data between the input step and the output step; and a construction step for constructing a combination of the input step, the work step, and the output step based on a description table in which the combination is described.

According to this method, it is possible to simplify the customization, expansion, etc., of functions.

According to still another aspect of the present invention, there is provided an image processing program. The program causes a computer to perform an input step of controlling input processing of image data to be input as an object for image processing; an output step of controlling output processing of the image data to be output; a work step of applying work processing to the image data between the input step and the output step; and a construction step of constructing a combination of the input step, the work step, and the output step based on a description table in which the combination is described.

According to this program, it is possible to simplify the customization, expansion, etc., of functions.

According to the embodiments of the present invention, it is possible to simplify the customization, expansion, etc., of functions.

Other objects, features and advantages of the present invention will become more apparent from the following detailed description when read in conjunction with the accompanying drawings.

BRIEF DESCRIPTION OF THE DRAWINGS

FIG. 7 shows an example of a description table generated by a description table generation part 134a;

DETAILED DESCRIPTION OF THE PREFERRED EMBODIMENTS

According to the embodiments of the present invention, a software architecture based on a concept called "pipes and filters" is applied to an image processing apparatus, thereby simplifying the customization, expansion, etc., of functions. In addition, filters are combined together using a description table in which the combination of the filters is described so as to construct a job, thereby further simplifying the customization, expansion, etc., of functions.

Figure 1:
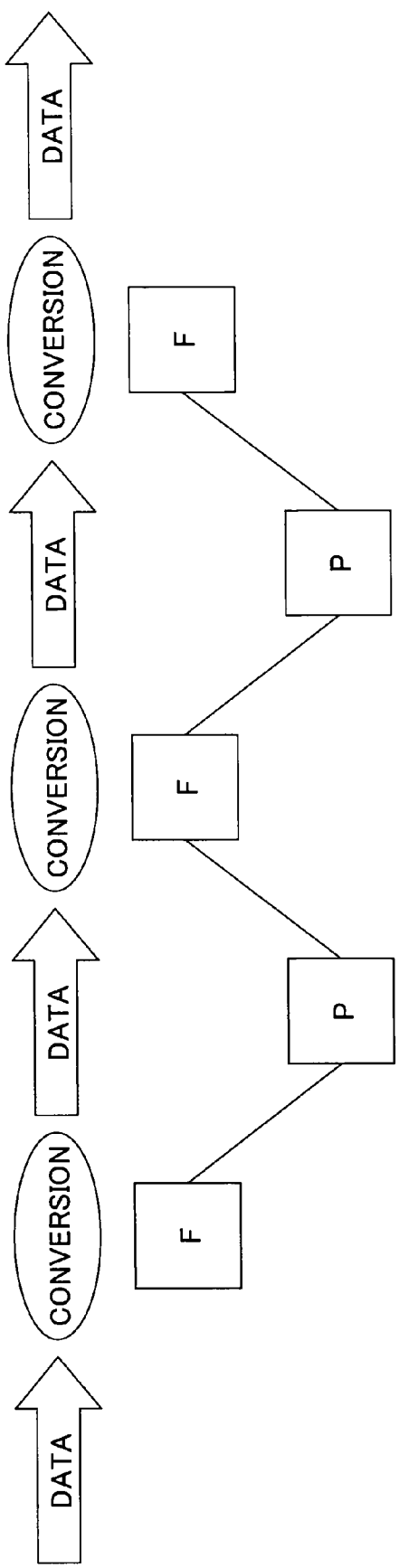
FIG. 1 is a diagram explaining the concept of "pipes and filters;"

Prior to the description of the embodiments of the present invention, the concept of "pipes and filters" applied to the image processing apparatus of the present invention is first described. FIG. 1 is a diagram explaining the concept of "pipes and filters." In FIG. 1, "P" and "F" represent a pipe and a filter, respectively.

The filter is a program that applies predetermined processing to input image data and outputs its processing result. The pipe is a unit that connects the filters to each other, and it temporarily holds the processing result output from the filter connected on its input side and then transmits the image data to the filter connected on its output side. Thus, according to the concept of "pipes and filters," it is possible to perform consecutive processing between the filters through the intervention of the pipes.

In the embodiments of the present invention, the predetermined processing applied by the filter is regarded as processing for applying a predetermined conversion to the input image data. In the image processing apparatus according to the embodiments of the present invention, in other words, it is regarded that functions to be implemented by the image processing apparatus undergo consecutive "conversion processing" with respect to a document (input image data). The consecutive functions of the image processing apparatus are inputting, working, and outputting a document, i.e., image data. Therefore, in the following description of the embodiments, "input processing," "work processing," and "output processing" are each regarded as "conversion processing," and a software component for implementing one conversion is specified as a filter.

In the embodiments of the present invention, the filter for controlling the input processing of image data, the filter for controlling the corresponding work processing, and the filter for controlling the corresponding output processing are specified as an input filter, a work filter, and an output filter, respectively. These filters are separate programs and do not depend on each other. Accordingly, it is possible for the image processing apparatus to separately add (install) and delete (uninstall) filters on a filter-by-filter basis.

Figure 2:
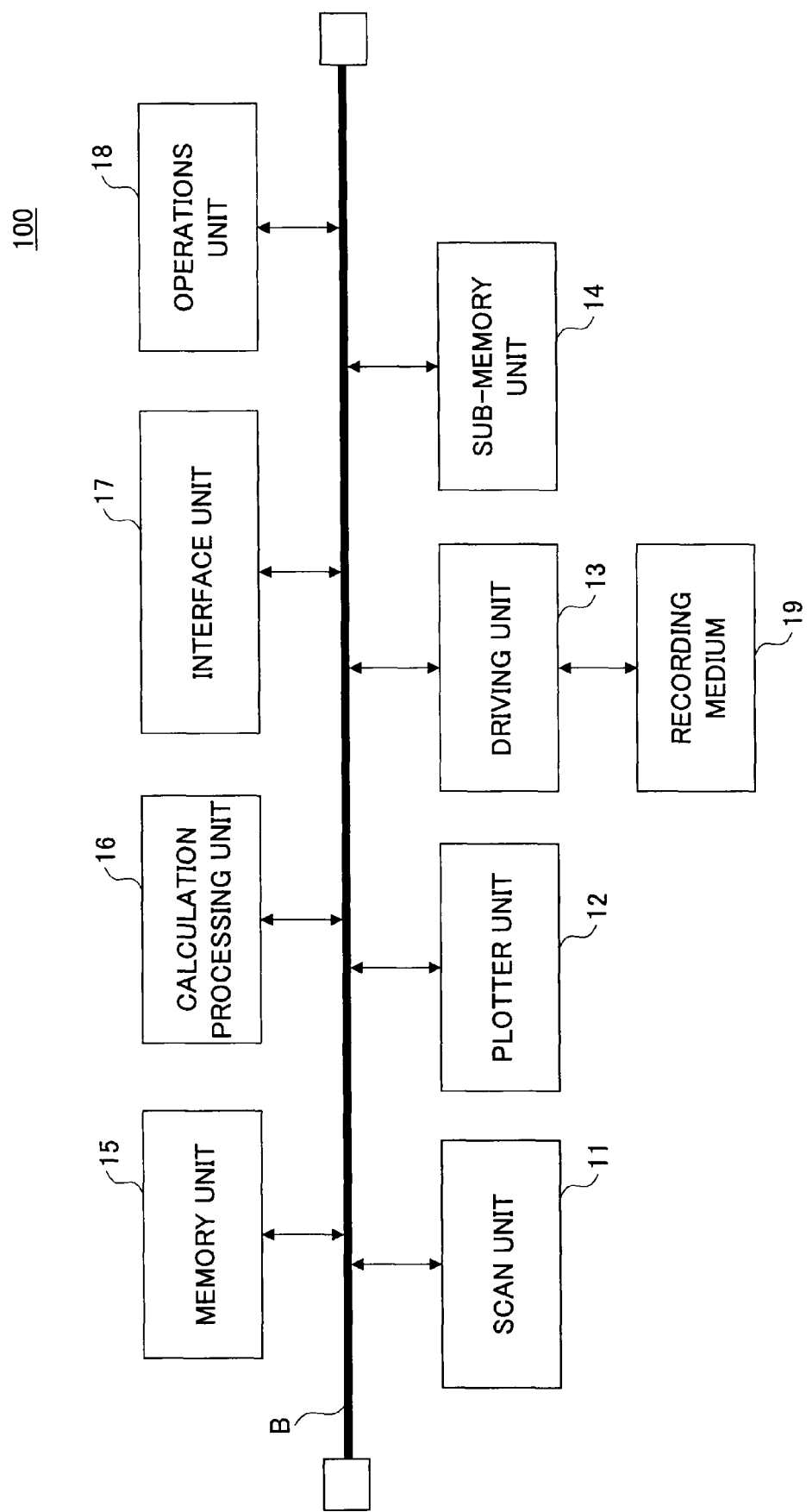
FIG. 2 is a hardware block diagram of an example of an image processing apparatus to which the concept of "pipes and filters" is applied.

FIG. 2 is a hardware block diagram of an example of the image processing apparatus to which the concept of "pipes and filters" is applied. An image processing apparatus 100 is composed of a scan unit 11, a plotter unit 12, a driving unit 13, a sub-memory unit 14, a memory unit 15, a calculation processing unit 16, an interface unit 17, and an operations unit 18, all of which are connected to one another via a bus B.

The scan unit 11 is composed of a scanner engine, etc., and used to scan a document so as to convert document data into image data. The plotter unit 12 is composed of a plotter engine, etc., and used to print image data. The interface unit 17 is composed of a modem, a LAN card, etc., and used to establish a connection to a network.

An image processing program according to the embodiments of the present invention is at least part of various programs that control the image processing apparatus 100. The image processing program is, for example, distributed through a recording medium 19 or downloaded from the network. As the recording medium 19 in which the image processing program is recorded, a recording medium such as a CD-ROM, a flexible disk, or a magneto optical disk that optically, electrically, or magnetically records information, a semiconductor memory such as a ROM or a flash memory that electrically records information, etc., can be used.

Furthermore, when the recording medium 19 in which the image processing program is recorded is set in the driving unit 13, the image processing program is installed from the recording medium 19 to the sub-memory unit 14 through the driving unit 13. The image processing program downloaded from the network is installed in the sub-memory unit 14 through the interface unit 17.

The image processing apparatus 100 stores necessary files, image data, etc., together with the installed image processing program. The memory unit 15 reads the image processing program from the sub-memory unit 14 when a computer is activated and loads the read image processing program. Then, the calculation processing unit 16 implements various processing as described below in accordance with the image processing program loaded in the memory unit 15.

First Embodiment

Figure 3:
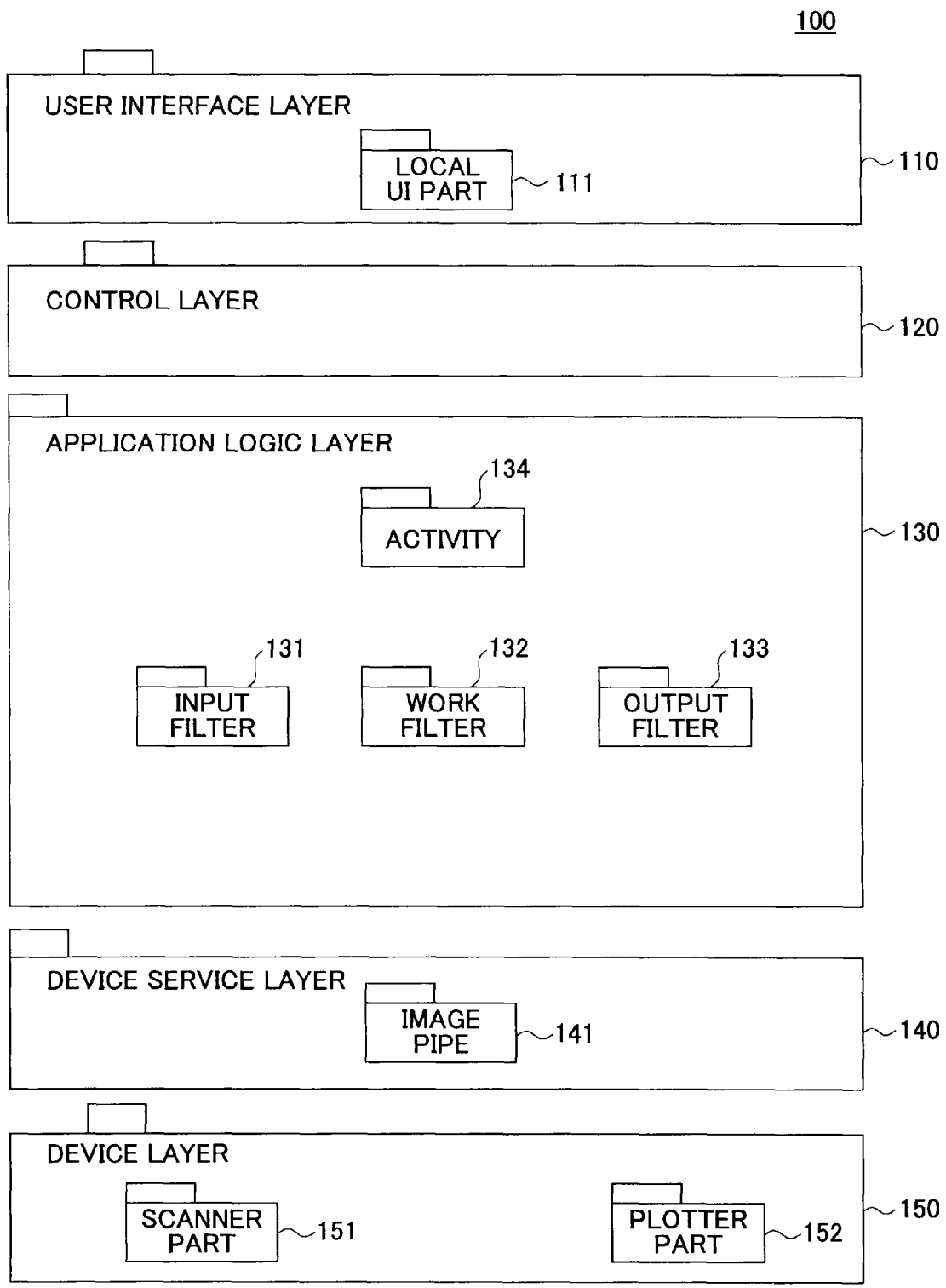
FIG. 3 is a block diagram showing a software configuration of an image processing apparatus 100 according to a first embodiment of the present invention.

FIG. 3 is a block diagram showing a software configuration of the image processing apparatus 100 according to a first embodiment of the present invention. The image processing apparatus 100 is a multi-function machine that implements multiple functions of a printer, a copier, a scanner, a facsimile machine, etc., in a single housing.

Software that implements the functions of the image processing apparatus 100 has a hierarchical structure and is composed of a user interface layer 110, a control layer 120, an application logic layer 130, a device service layer 140, and a device layer 150. A hierarchical relationship between the layers is based on a call relationship between the layers. In other words, in FIG. 3, an upper layer calls a lower layer.

In the image processing apparatus 100, when the user issues instructions for executing various functions to the user interface layer 110, the user interface layer 110 calls the control layer 120 and controls the application logic layer 130 based on the instructions. The application logic layer 130 executes an application that implements a requested function based on the instructions from the control layer 120. Then, based on the execution result, the device service layer 140 and the device layer 150 control a hardware resource of the image processing apparatus 100. The image processing apparatus 100 obtains an output result corresponding to the function that the user interface layer 110 receives in the above operation.

The layers are described below.

The user interface layer 110 has, for example, a local UI (User Interface) part 111 that has the function of receiving instructions for implementing the various functions of the image processing apparatus 100. Here, the various functions represent a copy function, a print function, a scan function, a facsimile function, etc. The local UI part 111 may be provided, for example, in the operations unit 18 of the image processing apparatus 100. The operations unit 18 may be replaced, for example, by an operations panel having a display area, etc. The instructions received by the local UI part 111 of the user interface layer 110 are transmitted to the control layer 120.

The control layer 120 has the function of controlling the processing that implements the functions of the image processing apparatus 100. Specifically, the control layer 120 controls the execution of a filter of the application logic layer 130 in accordance with a requested function. Note that the function of the image processing apparatus 100 as described in this embodiment is the definition of a service in a collective unit (until the image processing apparatus obtains the final output after receiving a request from the user) that is provided to the user by the image processing apparatus 100, and it is synonymous with an application that provides a service in a collective unit in terms of software.

The application logic layer 130 has the various filters as component groups that implement part of the functions provided by the image processing apparatus 100. In the application logic layer 130, the plural filters are combined together by the control of the control layer 120 so as to implement one function. The application logic layer 130 of this embodiment has an input filter 131, a work filter 132, an output filter 133, and an activity 134. The filters are operated and controlled based on definitions for the filters. The details of the filters are described below. The activity 134 is a component that connects the filters to each other in accordance with a function requested through the user interface layer 110 and coordinates the executions of the filters.

The device service layer 140 has the lower function shared by the filters of the application logic layer 130. The device service layer 140 of this embodiment has an image pipe 141. The image pipe 141 implements the function described above and transmits an output result from one to another of the filters of the application logic layer 130. Here, the image pipe 141 may connect, for example, the input filter 131 and the work filter 132 to each other or connect the work filter 132 and the output filter 133 to each other.

The device layer 150 has drivers as programs that control hardware. The device layer 150 of this embodiment has a scanner part 151, a plotter part 152, etc. These parts 151 and 152 control the scan unit 11 and the plotter units 12, respectively.

Next, the filters of the application logic layer 130 are described in detail.

The input filter 131 of this embodiment controls the input processing of image data input from the outside of the image processing apparatus 100. The input filter 131 includes a scan filter, an e-mail reception filter, a facsimile reception filter, a PC document reception filter, a report filter, etc., (not shown). The scan filter controls the scanning of image data, for example, by a scanner and outputs the scanned image data. The e-mail reception filter receives an e-mail in the image processing apparatus 100 and outputs image data contained in the received e-mail. The facsimile reception filter controls facsimile reception and outputs received image data. The PC document reception filter receives print image data from a client PC (not shown), etc., and outputs the print image data. The report filter arranges setting information, history information, etc., of the image processing apparatus 100, for example, in tabular form and outputs the arranged image data.

The work filter 132 of this embodiment applies the predetermined work processing to image data input from the filter on its input side and then outputs a processing result to the filter on its output side. Here, the work processing represents the processing of integration, expansion, contraction, rotation, etc., of the input image data.

The output filter 133 of this embodiment controls the output processing of input image data and then outputs the processed image data to the outside of the image processing apparatus 100. The output filter 133 includes a print filter, a preview filter, an e-mail transmission filter, a facsimile transmission filter, a PC document transmission filter, a document registration filter, etc.

The print filter causes the plotter part 152 to output (print) the input image data. The preview filter causes the input image data to be previewed on the operations unit 18, etc., of the image processing apparatus 100. The e-mail transmission filter transmits the input image data as an attachment to an e-mail. The facsimile transmission filter transmits the input image data by facsimile. The PC document transmission filter transmits the input image data to a client PC (not shown), etc. The document registration filter outputs the input image data to the sub-memory unit 14, etc., so as to be accumulated therein.

The activity 134 of this embodiment receives the instructions input from the local UI part 111 of the user interface layer 110 through the control layer 120. In accordance with the instructions, the activity 134 controls the executions of the jobs of the input filter 131, the work filter 132, and the output filter 133.

In the application logic layer 130, the filters are combined together to implement the functions of the image processing apparatus 100. According to this construction, the image processing apparatus 100 makes it possible to implement the various functions in accordance with the combination of the filters and the pipes. For example, when the copy function is implemented, it is only necessary to combine the scan filter included in the input filter 131, the work filter 132, and the print filter included in the output filter 133 together.

Figure 4:
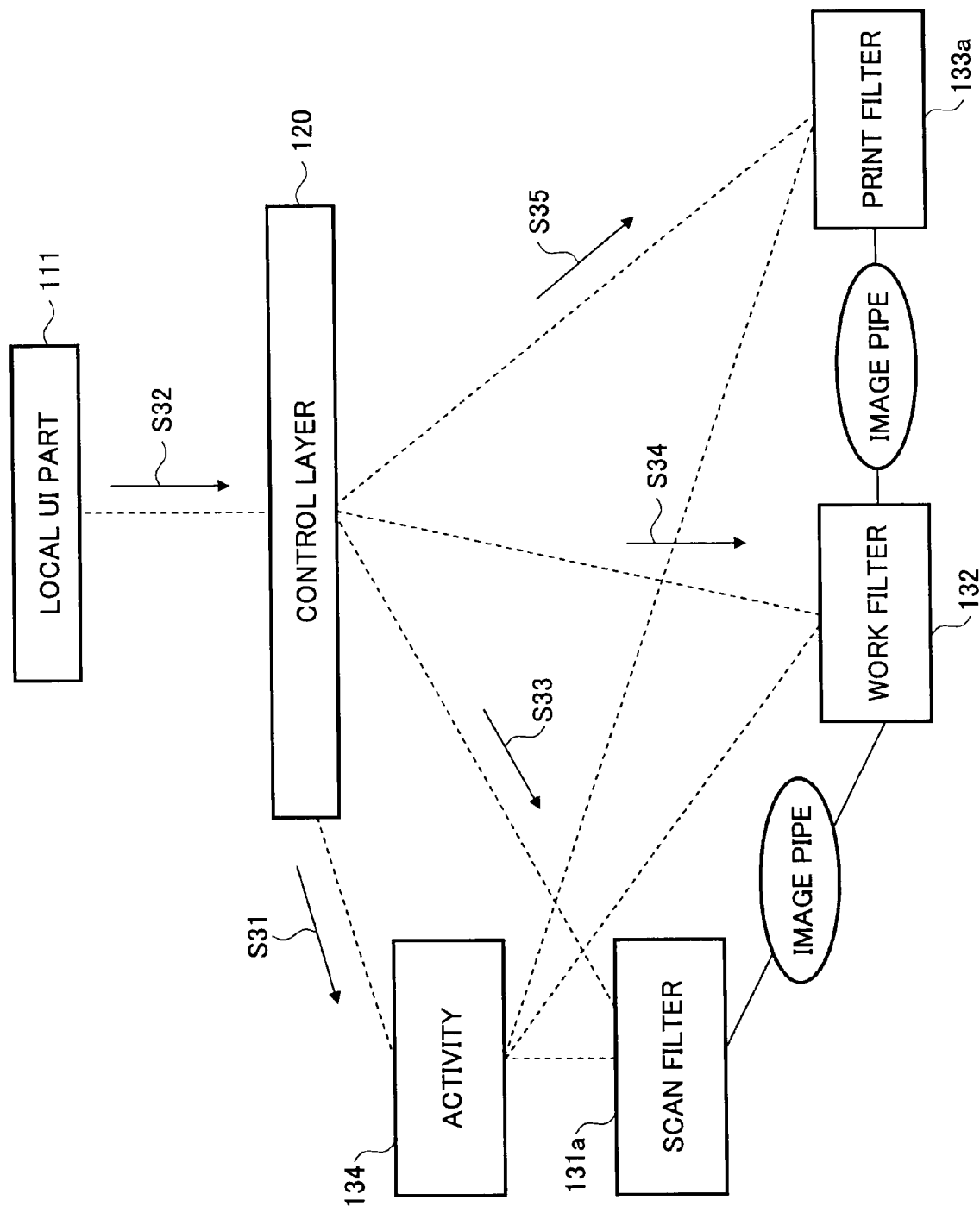
FIG. 4 is a diagram explaining print processing in the image processing apparatus 100 according to the first embodiment.

Next, print processing in the image processing apparatus 100 of this embodiment is described. FIG. 4 is a diagram explaining the print processing in the image processing apparatus 100 according to the first embodiment.

In the image processing apparatus 100 of this embodiment, the control layer 120 generates jobs so that the activity 134 controls the execution of the processing in the filters (S31). In the image processing apparatus 100 of this embodiment, the jobs controlled by the activity 134 may be generated, for example, when the power to the image forming apparatus 100 is turned on.

Upon receipt of a request to execute the print processing, the local UI part 111 transmits the request to the control layer 120 (S32). Note that FIG. 4 exemplifies a case in which copy processing as the print processing is selected. In this case, operations for instructing the scanning and printing of a paper document are performed in the local UI part 111.

Upon receipt of the instructions for scanning and printing the paper document, the activity 134 connects a scan filter 131*a*, the work filter 132, and a print filter 133*a* to each other through the image pipes. Note that at this time a scan filter included in the scan filter 131*a* is actually connected to the work filter 132. Then, the control layer 120 generates the job to be executed by the scan filter 131*a* (S33), the job to be executed by the work filter 132 (S34), and the job to be executed by the print filter 133*a* (S35).

When the jobs to be executed by the filters are generated by the control layer 120, the activity 134 instructs the filters to execute the jobs. Then, processing for scanning the paper document with the scanner part 151 serving as an input part is executed by the scan filter 131*a*, and the paper document is scanned to produce image data. The image data are output from the scan filter 131*a* and transmitted to the work filter 132 through the image pipe 141.

The work filter 132 applies the predetermined work processing to the image data and outputs the processed image data. The processed image data are then transmitted to the print filter 133*a* serving as the output filter 133. The print filter 133*a* causes the processed image data to be output from the plotter part 152 serving as an output part so as to implement the copy processing.

As described above, because the input filter 131, the work filter 132, and the output filter 133 are separately controlled in this embodiment, the filters do not depend on each other. Therefore, when the functions are customized or expanded in this embodiment, the customization or expansion of the functions may be performed on a filter basis. According to this embodiment, it is thus possible to simplify the customization or expansion of the functions.

Second Embodiment

Referring to the accompanying drawings, a description is next made of a second embodiment of the present invention. The second embodiment of the present invention is obtained by modifying the first embodiment. In the following description of the second embodiment, the same constituents as those of the first embodiment are denoted by the same reference numerals and their descriptions are omitted.

In the image processing apparatus of this embodiment, an activity and filters, for example, are installed as plug-ins so as to solve the following problems occurring when functions are added, thereby making it possible to further simplify the customization or expansion of the functions.

Prior to the description of the image processing apparatus of this embodiment, the problems occurring when the activity and the filters are installed to add the functions are first described.

For example, when a new function is added to the image processing apparatus in which a combination of filters is constructed by an activity that provides various functions so as to execute processing, an activity that provides the new function is installed. When the activity that provides the new function is added, it is necessary to provide a construction part for constructing the combination of filters that implement the function in a process for developing the activity. Because the construction part is different for each function implemented by the activity, it is necessary to change construction parts, which in turn takes a number of development steps.

Basically, the activity has the same logic for construction processing as the construction part. Accordingly, in case the construction part is changed every time a new activity is developed, overlapped processes are caused in the process for developing the activity, which in turn causes needless development steps.

Here, assume that only the construction part is provided separate from the activity. In this case, when plural new activities are installed at the same time, the construction part is required to perform proper construction so as to correspond to the plural activities, which in turn makes the processing of the construction part complicated.

Accordingly, this embodiment is directed at solving the above problems. In the image processing apparatus of this embodiment, the activity generates a description table that describes the combination of filters, and the construction part that constructs the combination of the filters based on the description table is provided. Thus, the expansion of the functions is further simplified.

Figure 5:
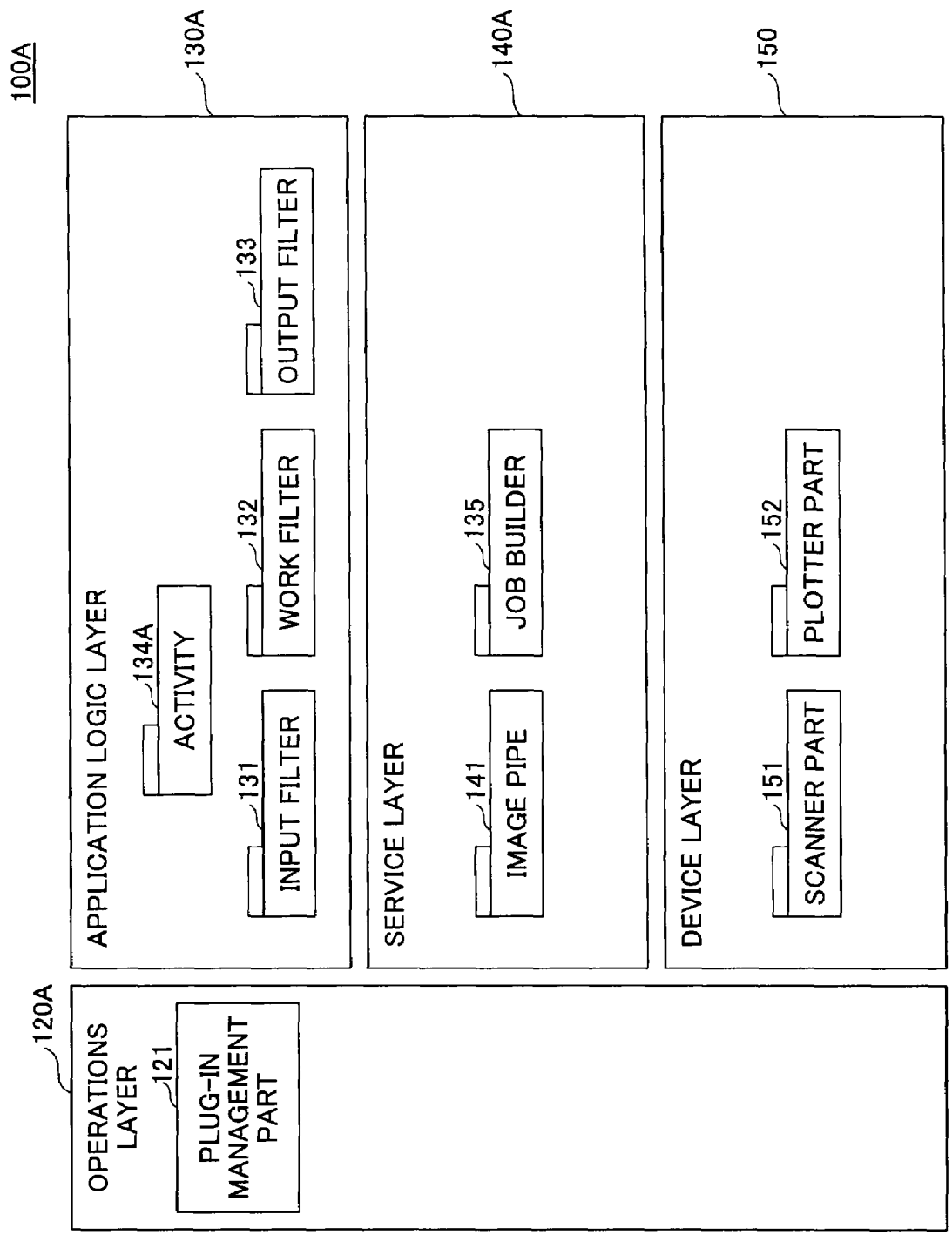
FIG. 5 is a block diagram showing a software configuration of an image processing apparatus 100A according to a second embodiment.

Referring to FIG. 5, a description is made of the image processing apparatus of this embodiment. FIG. 5 is a block diagram showing a software configuration of an image processing apparatus 100A according to the second embodiment.

The image processing apparatus 100A of this embodiment has an operations layer 120A, an application logic layer 130A, a service layer 140A, and the device layer 150.

The operations layer 120A controls the function shared by the other layers. The operations layer 120A has a plug-in management part 121. The plug-in management part 121 manages the addition and deletion of the activity and the filters in the image processing apparatus 100A.

The application logic layer 130A has the input filter 131, the work filter 132, the output filter 133, and an activity 134A. The details of the activity 134A are described below.

The service layer 140A has the lower function shared by the filters of the application logic layer 130A. The service layer 140A has the image pipe 141 and the job builder 135 described below. In addition, the service layer 140A has a request management part, a data management part, etc., (not shown). The request management part controls a job requested in the image processing apparatus 100A. The data management part accumulates and stores setting information of the filters of the application logic layer 130A, restoration information generated by the filters, etc.

Figure 6:
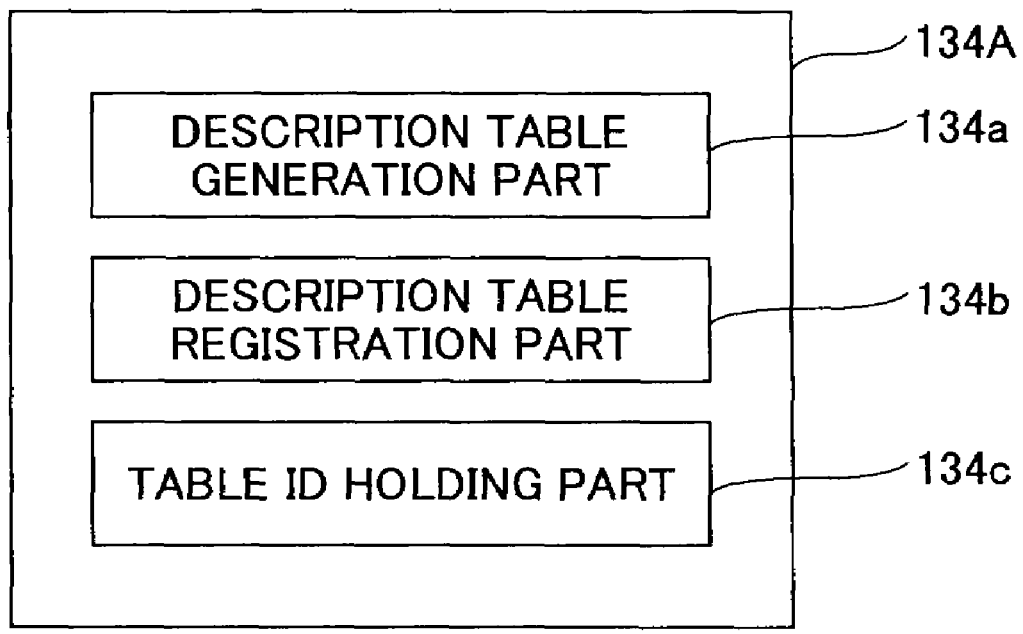
FIG. 6 is a diagram explaining the function of an activity 134A according to the second embodiment.
Figure 7:
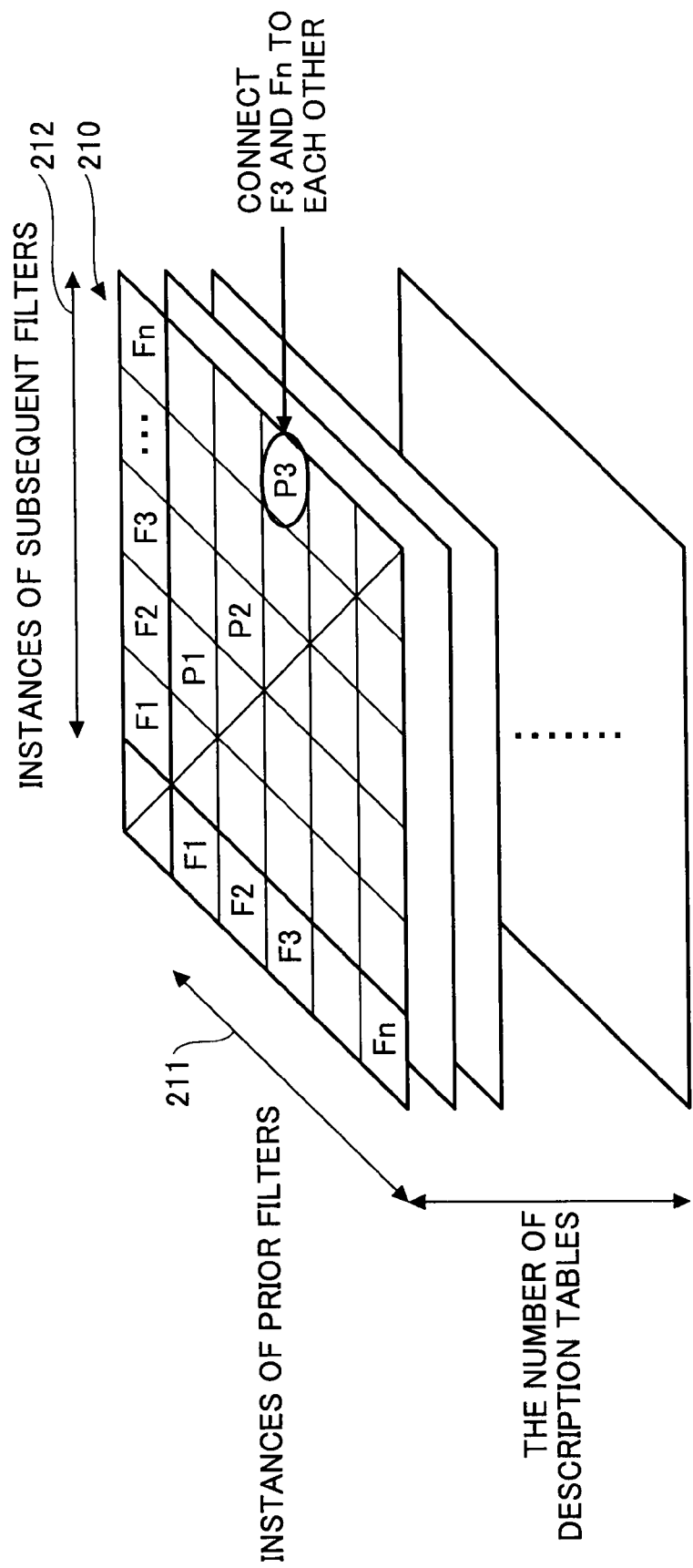
Figure 8:
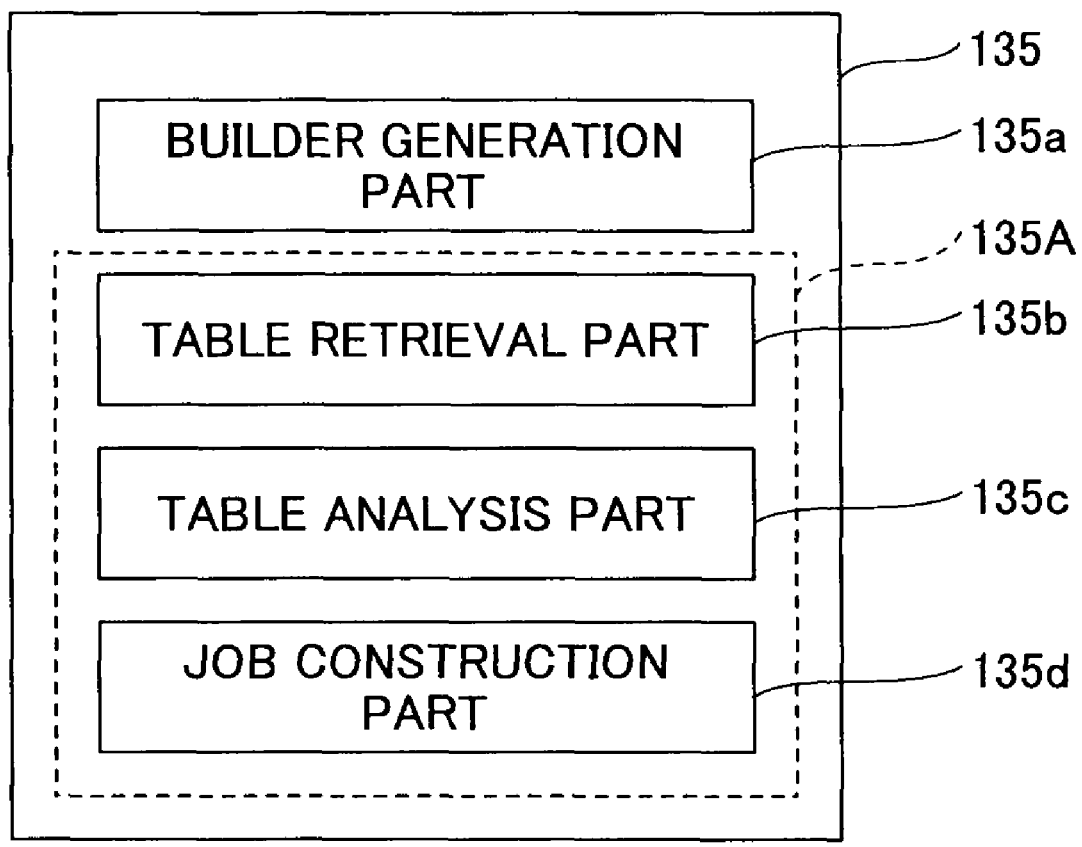
FIG. 8 is a diagram explaining a job builder 135 according to the second embodiment.

Referring to FIGS. 6 through 8, a description is next made of the activity 134A and the job builder 135 of this embodiment.

FIG. 6 is a diagram explaining the function of the activity 134A according to the second embodiment. In FIG. 6, the characteristic function of the activity 134A of this embodiment is shown. The activity 134A of this embodiment is an application component that provides the functions implemented by the image processing apparatus 100A. The activity 134A of this embodiment has a description table generation part 134*a*, a description table registration part 134*b*, and a table ID holding part 134*c*.

In the image processing apparatus 101A of this embodiment, the activities 134A are provided for the respective functions and have information such as the combination of filters required for implementing the functions. Specifically, for example, a copy activity for implementing the copy function has information that the combination of the filters including a scan filter, a work filter, and a print filter are required for implementing the copy function.

The description table generation part 134a generates the description table based on such information on the combination of the filters that the activity 134 has. Note that the description table generation part 134a provides an identifier to the generated description table so as to be identified.

Here, an example of the description table is shown in FIG. 7. In a description table 210 shown in FIG. 7, rows 211 in the longitudinal direction represent the instances of prior filters (the filters on the input side), while columns 212 in the lateral direction represent the instances of subsequent filters (the filters on the output side). In the example of the description table 210 of FIG. 7, P3 indicating the image pipe 141 is described in the box as a point of intersection between F3 the filter on the input side and Fn the filter on the output side. Accordingly, it is clear from the description table 210 that Fn the filter on the output side is connected to the subsequent stage of F3 the filter on the input side through the image pipe P3.

Furthermore, according to this embodiment, the number of generated description tables is different depending on the types of the functions provided by the activity 134A. The description table generation part 134a generates one or more description tables in accordance with the functions provided by the activity 134A.

Referring back to FIG. 6, a description is made of the function of the activity 134A again.

The description table registration part 134b registers the description table generated by the description table generation part 134a in a builder described below. The table ID holding part 134c holds a table ID as the description table identifier generated by the description table generation part 134a.

Referring to FIG. 8, a description is next made of the job builder 135 of this embodiment. FIG. 8 is a diagram explaining the job builder 135 according to the second embodiment.

A table retrieval part 135b retrieves a specified description table from those registered by the description table registration part 134b of the activity 134A. A table analysis part 135c analyzes the retrieved description table. A job construction part 135d constructs a filter configuration by combining filters together based on the analysis result of the table analysis part 135c and constructs a job to be executed in accordance with the filter configuration.

Figure 9:
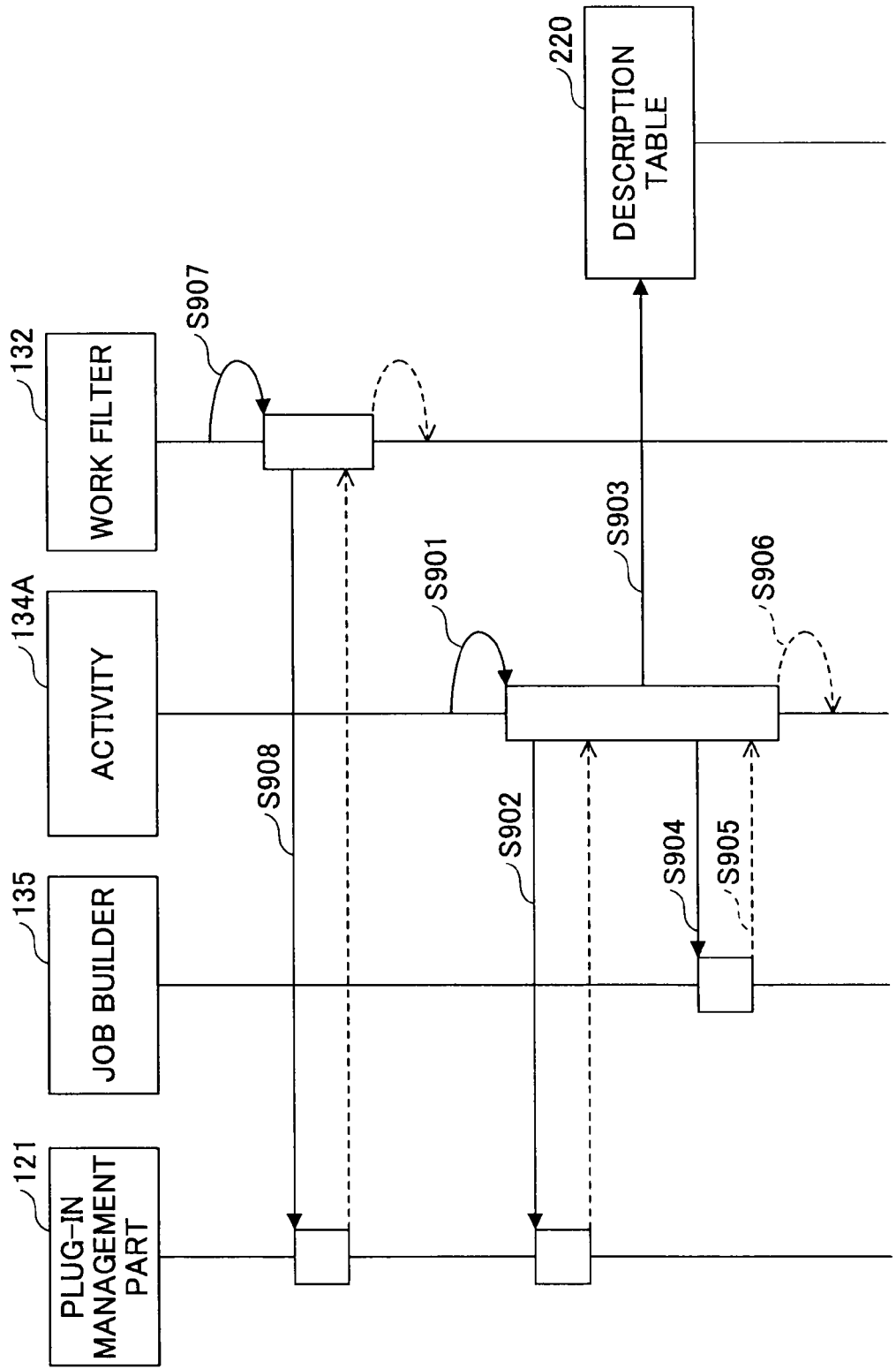
FIG. 9 is a sequence diagram explaining the installation of a new activity and a new filter in the image processing apparatus 100A according to the second embodiment.

Next, a description is made of an operation when a new activity and a new filter are installed in the image processing apparatus 100A of this embodiment. FIG. 9 is a sequence diagram explaining the installation of the new activity and the new filter in the image processing apparatus according to the second embodiment. Note that FIG. 9 exemplifies a case in which the activity 134A is installed as a new activity and the work filter 132 is installed as a new filter.

First, the installation of the activity 134A is described.

When the activity 134A is installed in the image processing apparatus 100A (S901), the activity 134A registers itself in the plug-in management part 121 (S902). Note that the plug-in management part 121 of this embodiment functions as a naming service part after this.

When the activity 134A registers itself in the plug-in management part 121, the description table generation part 134a generates the description table 210 of the activity 134A (S903). Assume that the description table 210 shown in FIG. 7 is generated here so as to make the following description. The activity 134A registers the generated description table 210 in the job builder 135 (S904). Upon receipt of the description table 210, the job builder 135 provides the identifier (table ID) of the description table 210 to the activity 134A (S905). The activity 134A holds the table ID with the table ID holding part 134c (S906). The installation of the activity 134 is thus completed.

Next, the installation of the work filter 132 is described. When the work filter 132 is installed in the image processing apparatus 100A (S907), the work filter 132 registers itself in the plug-in management part 121 (S908). The installation of the work filter 132 is thus completed.

Figure 10:
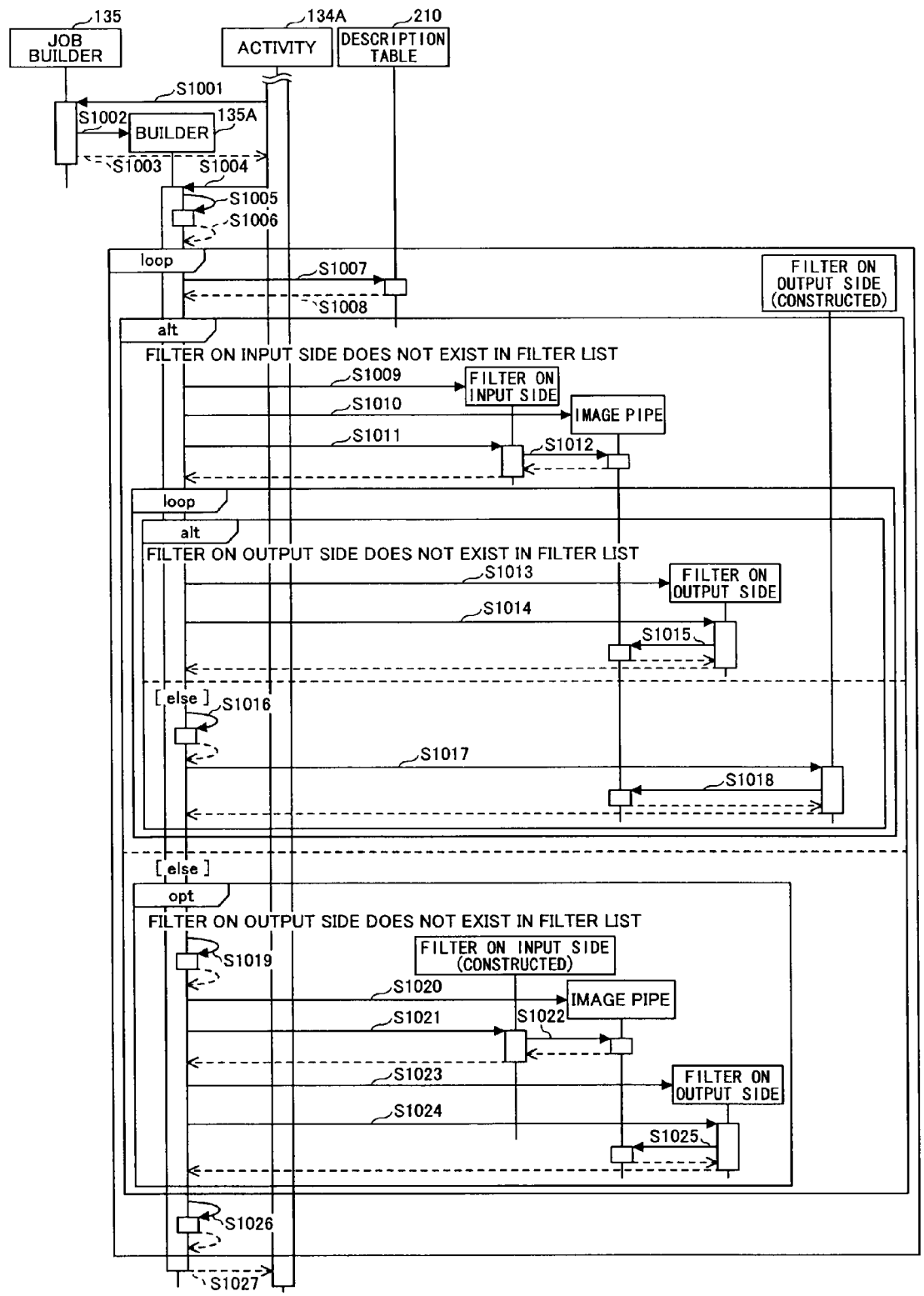
FIG. 10 is a sequence diagram explaining the construction of a job in the image processing apparatus 100A according to the second embodiment.

Next, a description is made of the construction of a job in the image processing apparatus 100A of this embodiment. FIG. 10 is a sequence diagram explaining the construction of the job in the image processing apparatus 100A according to the second embodiment. Note that FIG. 10 exemplifies a case in which the job that implements the functions provided by the activity 134A is constructed.

In response to an execution request, the activity 134A requests the job builder 135 to generate a builder object that constructs the job (S1001). Upon receipt of the request, the job builder 135 generates a builder 135A as the builder object with a builder generation part 135a (S1002) and informs the activity 134A of the generation of the builder 135A (S1003).

When the builder 135A is generated, the activity 134A provides the table ID of the description table 210 to the builder 135A (S1004). After receiving the table ID, the builder 135A retrieves the description table 210 corresponding to the table ID from those registered when the activity 134A is installed (S1005) and acquires the description table (S1006). Assume that the description table 210 shown in FIG. 7 is acquired here so as to make the following description.

When the builder 135A acquires the description table 210, the table analysis part 135c analyzes the description table 210, and then the job construction part 135d constructs the job by combining filters together. The processing after S1007 represents the analysis processing in which the table analysis part 135c analyzes the description table 210 and the construction processing in which the job construction part 135d constructs the job.

After acquiring the description table 210, the builder 135A prepares a filter list in which filters having been used for constructing jobs are stored. Note that at the time when the filter list is prepared, it has no stored information.

The builder 135A reads the i-th row from the acquired description table 210 with the table analysis part 135c (S1007). In S1007, "one" filter on the input side and "n" filters on the output side are found from the read row (S1008). For example, when the builder 135A reads the second row from the description table 210, F2 as the filter on the input side and F3 as the filter on the output side are found.

The builder 135A determines whether the filter on the input side read in S1007 exists in the filter list. If the read filter on the input side does not exist in the filter list, it is a new filter. Accordingly, the builder 135A generates the filter on the input side (S1009).

Note that in the image processing apparatus 100A of this embodiment, the filter on the input side would be the input filter 131 or the work filter 132. Accordingly, the filter on the input side here represents the input filter 131 or the work filter 132. In accordance with the functions provided by the activity 134A, any one of the filters included in the input filter 131 or the work filter 132 may be the filter on the input side.

Furthermore, the "generation of a filter" in this embodiment actually represents acquiring a filter (application) main body registered in the plug-in management part 121 to generate the copy of the filter main body, thereby generating the instances of the filter.

When the filter on the input side is generated, the builder 135A generates the image pipe to be connected to the generated filter on the input side, while referring to the description table 210 (S1010). For example, in the case of the second row in the description table 210, the image pipe P2 is connected to F2 as the filter on the input side. Therefore, the builder 135A generates the image pipe P2.

After the generation of the filter on the input side and the image pipe, the builder 135A connects the filter on the input side and the image pipe to each other with the job construction part 135*d* (S1011 and S1012).

Then, the builder 135A determines whether the filter on the output side, which is generated in S1009 and is to be connected to the subsequent stage of the filter on the input side, exists in the filter list. If the filter on the output side does not exist in the filter list, it is a new filter. Accordingly, the builder 135A generates the filter on the output side (S1013).

Note that in the image processing apparatus 100A of this embodiment, the filter on the output side would be the work filter 132 or the output filter 133. Accordingly, the filter on the output side here represents the work filter 132 or the output filter 133. In accordance with the functions provided by the activity 134A, any one of the filters included in the work filter 132 or the output filter 133 may be the filter on the output side.

Note that when the table analysis part 135*c* reads the second row from the description table 210 in S1007, the filter on the output side is F3. Accordingly, the builder 135A generates F3 as the filter on the output side in S1012. After the generation of the filter on the output side, the builder 135A connects the generated filter on the output side and the image pipe P2 generated in S1010 to each other (S1014 and S1015).

Furthermore, if the filter on the output side exists in the filter list, it is a filter that has been constructed. Therefore, the builder 135A connects the image pipe generated in S1010 and the constructed filter on the output side to each other.

The builder 135A acquires from the filter list the filter on the output side read from the description table (S1016). Specifically, for example, if F3 as the filter on the output side read from the description table 210 exists in the filter list, the builder 135A acquires F3 as the filter on the output side from the filter list.

After acquiring the filter on the output side, the builder 135A connects the image pipe generated in S1010 and the filter on the output side to each other (S1017 and S1018). Specifically, the builder 135A connects the image pipe P2 and F3 as the filter on the output side to each other.

The builder 135A repeats the processing of S1013 through S1018 by the number of filters on the output side read from the description table in S1007. For example, in case two filters on the output side are found when the builder 135 reads the i-th row from the description table in S1007, the processing of S1013 through S1018 is repeated twice.

In the image processing apparatus 100A of this embodiment, the job is thus constructed in accordance with the combination of the filters described in the description table.

Next, a description is made of a case in which the filter on the input side read in S1007 exists in the filter list.

If the filter on the input side exists in the filter list, the filter on the output side does not exist in the filter list. Accordingly, the builder 135A generates the filter on the output side, while referring to the description table. Here, a description is made of the reason why the filter on the output side does not exist in the filter list if the filter on the input side exists in the filter list.

If the filter on the input side exists in the filter list, it is a filter that has been constructed. Moreover, if the filter on the output side to be connected to the filter on the input side also exists in the filter list, the same description as that generated in the past is being made. This description is redundant. Therefore, if this description is included in the description table, the builder 135A ignores it. Thus, according to this embodiment, the filter on the input side and the filter on the output side do not exist together in the filter list.

If the filter on the input side read from the description table exists in the filter list in S1007, the builder 135A acquires it from the filter list (S1019). For example, when the filter on the input side read in S1007 is the filter F2, the builder 135A acquires it from the filter list.

Then, while referring to the description table, the builder 135A generates the image pipe that connects the filter on the input side and the filter on the output side to each other (S1020). According to the description table 210, the image pipe generated here is an image pipe P2. After the generation of the image pipe, the builder 135A connects the filter on the input side and the image pipe to each other (S1021 and S1022). According to the description table 210, the filter F2 and the image pipe P2 are connected to each other.

The builder 135A finds from the description table the filter on the output side to be connected to the filter on the input side and generates the filter on the output side (S1023). According to the description table 210, the filter on the output side generated here is a filter F3. After the generation of the filter on the output side, the builder 135A connects the filter on the output side and the image pipe generated in S1018 to each other (S1024 and S1025).

In the image processing apparatus 100A of this embodiment, the filters are thus combined together when the filter on the input side exists in the filter list so as to construct the job.

After the construction of the job, the builder 135A registers the filter appearing for the first time in the processing of S1009 through S1025 in the filter list as the constructed filter (S1026). The filter registered in the filter list is held in the builder 135A as the constructed filter.

The builder 135A repeats the processing of S1007 through S1026 by the number of rows of the acquired description table. For example, when the acquired description table is the description table 210, the processing of S1007 through S1026 is repeated n times. Then, the builder 135A returns to the activity 134A only the list of the filters on the input side registered in the filter list (S1027) and completes the construction processing for constructing the job. With the acquisition of the list of the filters on the input side, the activity 134A can trace all the filters in the constructed job.

As described above, because the image processing apparatus 100A of this embodiment constructs the job based on the description table in which the combination of the filters is described, it is only required to construct the job in accordance with the description table without executing special processing for constructing the job even when the new activity 134A is installed. Thus, according to the image processing apparatus 100A of this embodiment, it is possible to further simplify the customization or expansion of the functions.

Next, referring to FIGS. 11A through 11E, a description is made of other examples of the description table of this embodiment. FIGS. 11A through 11E are diagrams explaining other examples of the description table according to the second embodiment.

Figures 11A, 11B, 11C:
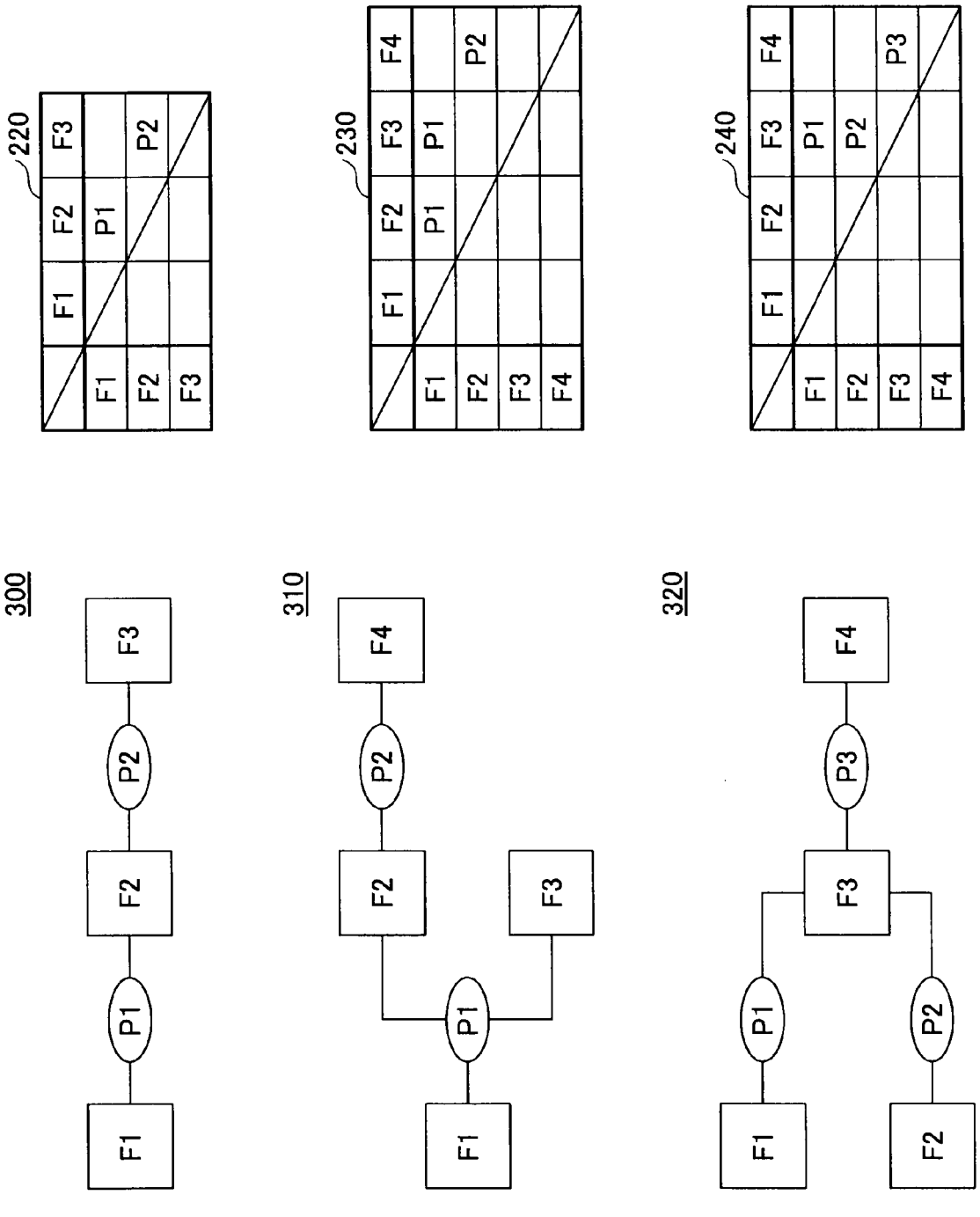
FIGS. 11A through 11E are diagrams explaining other examples of a description table according to the second embodiment.

FIG. 11A shows the activity of a filter configuration 300 having no branching point and a description table 220 thereof. FIG. 11B shows the activity of a filter configuration 310 having multiple outputs and a description table 230 thereof. The multiple outputs of the filter configuration 310 represent a configuration in which plural filters on the output side are connected to one filter on the input side.

For example, an activity, which provides the function of printing the image data scanned by the scan unit 11 and transmitting the same by e-mail in the image processing apparatus 100A, is configured to have the filter configuration having the multiple outputs. The example of FIG. 11B shows the configuration having multiple outputs in which two filters F2 and F3 on the output side are connected to one filter F1 on the input side.

FIG. 11C shows the activity of a filter configuration 320 having multiple inputs and a description table 240 thereof. The multiple inputs of the filter configuration 320 represent a configuration in which plural filters on the input side are connected to one filter on the output side. The example of FIG. 11C shows the configuration having the multiple inputs in which one filter F3 on the output side is connected to two filters F1 and F2 on the input side.

Figure 11D:
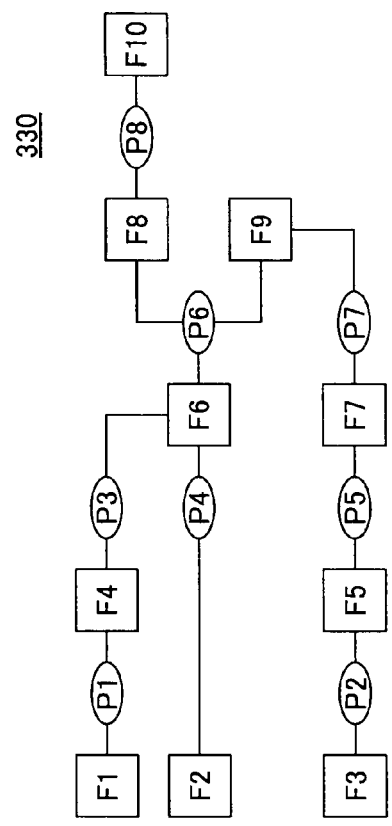

FIG. 11D shows the activity of a filter configuration 330 having multiple inputs and multiple outputs together and a description table 250 thereof.

Figure 11E:
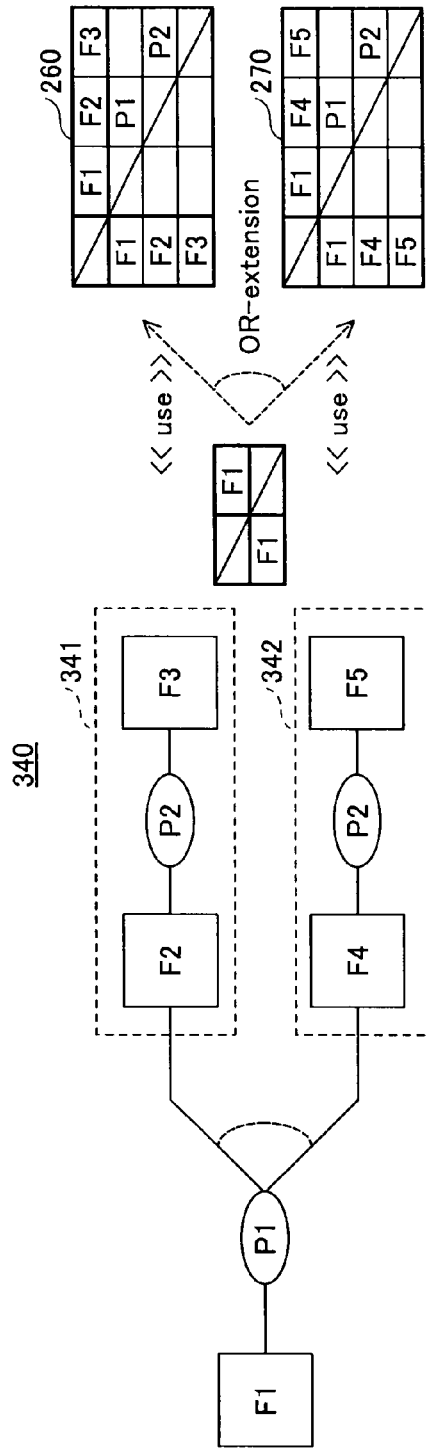

FIG. 11E shows a filter configuration 340 in which the combination of subsequent filters is determined based on the execution result of a prior filter and description tables 260 and 270 thereof.

In the filter configuration 340 shown in FIG. 11E, the job of a filter F1 is first constructed. Then, a description table to be used later is determined based on the constructed job. For example, when a path 341 is determined as an output path after the job of the filter F1 is constructed, the builder 135A acquires the description table 260 in S1006 of FIG. 10. Furthermore, when a path 342 is determined as the output path after the job of the filter F1 is constructed, the builder 135A acquires the description table 270.

Furthermore, when another path composed of plural filters is connected before the paths 341 and 342, the processing of S1007 through S1027 in FIG. 10 is performed based on the description table for constructing the other path. After this, the description table 260 or the description table 270 corresponding to path 341 or path 342, respectively, is acquired again to repeat the same processing.

Here, an example of the processing executed by the filter configuration 340 shown in FIG. 11E is described.

As an example of the processing executed by the filter configuration 340, the image processing apparatus 100A executes processing by receiving a command from a PC (Personal Computer) connected via a network, etc. The processing is executed by a reception activity (not shown) of the image processing apparatus 100A. The reception activity provides a requested function based on the command received from outside.

When the image processing apparatus 100A receives the command from the PC, the reception activity constructs a job using a first table (including only a PC reception filter). When the job is constructed, the PC reception filter analyzes the received command and informs the reception activity of the analysis result. Note that the PC reception filter is one of input filters 131A and receives as input data commands from external devices connected to the image processing apparatus 100A.

When the command received from the outside includes to perform drawing with a printer, the reception activity adds a second table including the work filter 132 and the print filter 133a so as to construct a job. Furthermore, when the command received by the PC reception filter includes to accumulate data in the image processing apparatus 100A, the reception activity adds a third table including a document storage filter that stores data so as to construct a job.

Furthermore, in the image processing apparatus 100A of this embodiment, another example of the processing executed by the filter configuration 340 includes barcode scan processing.

The processing is executed by the barcode scan activity (not shown) of the image processing apparatus 100A. The barcode scan activity analyzes the barcode scanned by the scan filter 131a with a barcode analysis filter (not shown) and provides a requested function based on the analysis result.

First, the barcode scan activity constructs a job using the first table including the scan filter 131a and the barcode analysis filter. When the job is constructed, the scan filter 131a scans a document, and then the barcode analysis filter analyzes the scanned result. The barcode analysis filter informs the barcode scan activity of the analysis result. When the analysis result indicates instructions for copying the document, the barcode scan activity adds the second activity including the work filter 132 and the print filter 133a and then copies the scanned document. Furthermore, when the analysis result indicates instructions for transmitting an e-mail, the barcode scan activity adds the third table including the work filter 132 and the e-mail transmission filter and then transmits the scanned document by e-mail to the address included in the barcode.

Thus, according to the image processing apparatus 100A of this embodiment, it is possible to further simplify the customization or expansion of the functions.

The present invention is not limited to the specifically disclosed embodiments, but variations and modifications may be made without departing from the scope of the present invention.

The present application is based on Japanese Priority Application No. 2007-284199 filed on Oct. 31, 2007, the entire contents of which are hereby incorporated herein by reference.

What is claimed is:

1. An image processing apparatus comprising:
   an input filter that controls input processing of image data to be input as an object for image processing;
   an output filter that controls output processing of the image data to be output;
   a work filter that applies work processing to the image data between the input filter and the output filter; and
   a construction component that constructs a combination of the input filter, the work filter, and the output filter based on a description table in which the combination is described, the description table being of a plurality of description tables,
   wherein:
   the construction component connects a combination of filters described by one of the plurality of description tables and a combination of filters described by another of the plurality of description tables to each other.

2. The image processing apparatus according to claim 1, further comprising:
   an application component that provides a function of the image processing apparatus; wherein the application component includes:
   a table generation part that generates the plurality of description tables based on a requested function, and
   a table registration part that registers the plurality of description tables generated by the table generation part in the construction component.

3. The image processing apparatus according to claim 1, wherein:
   the construction component includes a table analysis part that analyzes the description table and constructs the combination of the input filter, the work filter, and the output filter based on an analysis result of the table analysis part.

4. The image processing apparatus according to claim 1, further comprising at least three of the plurality of description tables, wherein:
the construction component selects at least the other two of the plurality of description tables based on the combination of the filters described by the one of the plurality of description tables and constructs a combination of filters based on the selected description tables.

5. An image processing method comprising:
an input step of controlling input processing of image data to be input as an object for image processing;
an output step of controlling output processing of the image data to be output;
a work step of applying work processing to the image data between the input step and the output step; and
a construction step of constructing a combination of the input step, the work step, and the output step based on a description table in which the combination is described, the description table being of a plurality of description tables,
wherein the construction step connects a combination of filters described by one of the plurality of description tables and a combination of filters described by another of the plurality of description tables to each other.

6. The image processing method according to claim 5, further comprising:
an application step of providing a function of an image processing apparatus including:
a table generation step of generating the description table based on a requested function; and
a table registration step of registering the description table generated by the table generation step in the construction step.

7. The image processing method according to claim 5, wherein:
the construction step includes a table analysis step of analyzing the description table and constructs the combination of the input filter, the work filter, and the output filter based on an analysis result of the table analysis step.

8. The image processing method according to claim 5, wherein:
the construction step selects at least two of at least three of the plurality of description tables based on the combination of the filters described by the one of the plurality of description tables and constructs a combination of filters based on the selected description tables.

9. A non-transitory computer readable medium including an image processing program that causes a computer to perform:
an input step of controlling input processing of image data to be input as an object for image processing;
an output step of controlling output processing of the image data to be output;
a work step of applying work processing to the image data between the input step and the output step; and
a construction step of constructing a combination of the input step, the work step, and the output step based on a description table in which the combination is described, the description table being of a plurality of description tables,
wherein the construction step connects a combination of filters described by one of the plurality of description tables and a combination of filters described by another of the plurality of description tables to each other.

10. The computer readable medium according to claim 9, further comprising:
an application step of providing a function of an image processing apparatus including:
a table generation step of generating the description table based on a requested function; and
a table registration step of registering the description table generated by the table generation step in the construction step.

11. The computer readable medium according to claim 9, wherein:
the construction step includes a table analysis step of analyzing the description table and constructs the combination of the input filter, the work filter, and the output filter based on an analysis result of the table analysis step.

12. The computer readable medium according to claim 9, wherein:
the construction step selects at least two of at least three of the plurality of description tables based on the combination of the filters described by the one of the plurality of description tables and constructs a combination of filters based on the selected description tables.

* * * * *